UNITED STATES PATENT OFFICE.

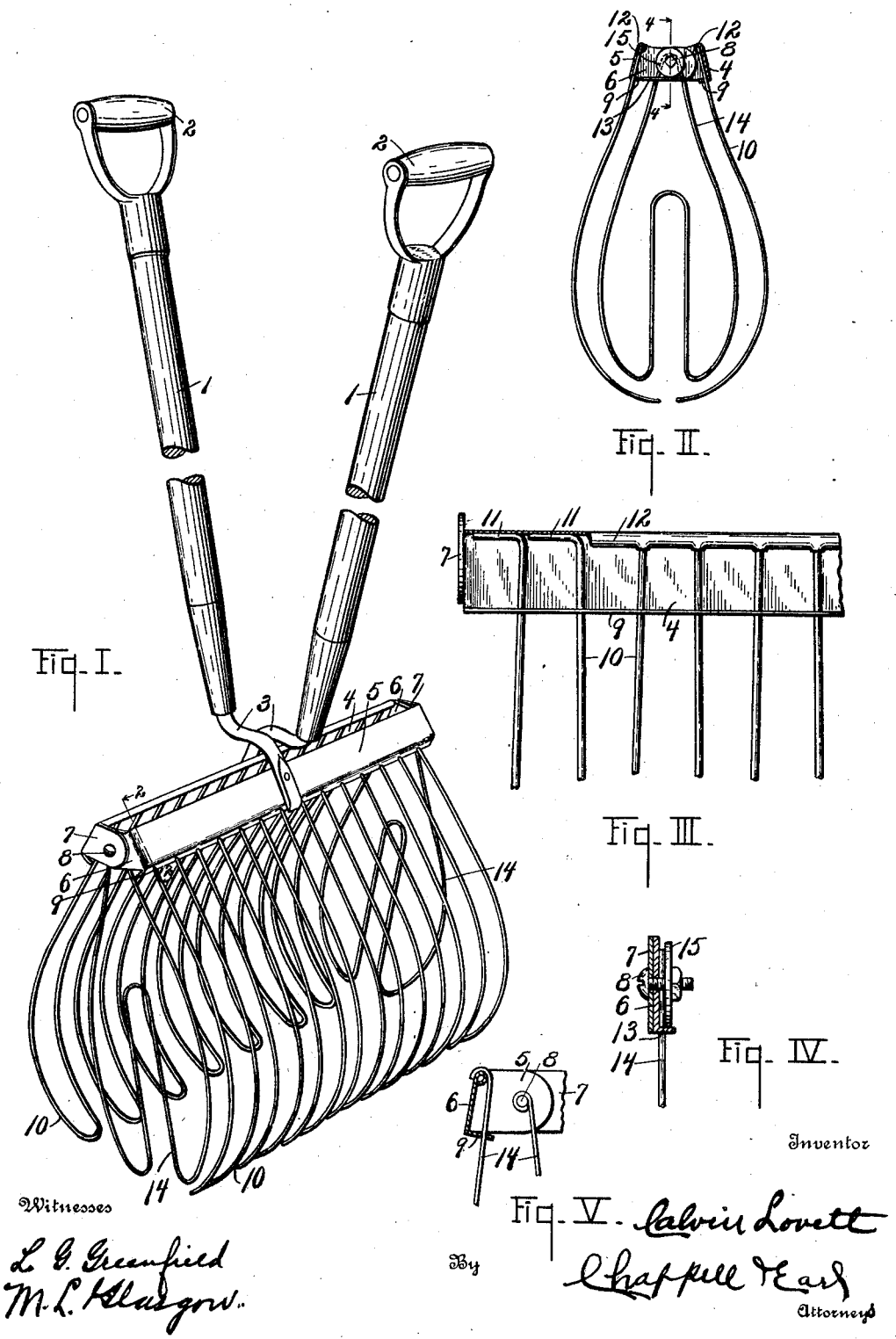

CALVIN LOVETT, OF KALAMAZOO, MICHIGAN.

GATHERING IMPLEMENT.

1,005,247. Specification of Letters Patent. Patented Oct. 10, 1911.

Application filed March 20, 1911. Serial No. 615,549.

*To all whom it may concern:*

Be it known that I, CALVIN LOVETT, a citizen of the United States, residing at Kalamazoo, Michigan, have invented certain new and useful Improvements in Gathering Implements, of which the following is a specification.

This invention relates to improvements in gathering implements.

My improved implement or tool, is especially designed by me for use in picking up potatoes or other vegetables from the ground, although it is adapted and desirable for use in removing potatoes or roots or corn, or the like, from a bin or pile and for various other purposes.

The main objects of this invention are to provide an improved implement, adapted for use as above stated, which is effective for the purpose, light in weight and at the same time easily manipulated and one which is strong and durable.

Another object is to provide an implement for gathering or picking up vegetables or fruits, which may be rapidly manipulated without bruising or otherwise injuring the objects picked up.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a perspective view of a structure embodying the features of my invention. Fig. II is a vertical section taken on a line corresponding to line 2—2 of Fig. I. Fig. III is a detail inside view of one of the head bars, a portion being broken away, the better to illustrate the structural details. Fig. IV is an enlarged detail section, taken on a line corresponding to line 4—4 of Fig. II. Fig. V is an enlarged detail of a slightly modified construction.

In the drawings, similar reference characters refer to similar parts throughout the several views, and the sectional views are taken looking in the direction of the little arrows at the ends of the section lines.

Referring to the drawings, the handles 1, are preferably provided with the hand pieces or hand holds 2, for convenience in manipulation. The shanks 3 of these handles are secured to the head bars 4 and 5. These head bars are provided with pivot ears 6 and 7 at their ends, which are connected by means of the pivots 8. The head bars are provided with inturned flanges 9 at their lower edges, perforated to receive the fingers 10. The fingers 10 are preferably formed of loops of wire arranged through the perforations in the flanges 9. The upper ends of the fingers are turned laterally as at 11 and engaged by or clamped in the infolded upper edges 12 of the bars. The fingers are thus effectively secured to the bars and the securing means is such that the fingers are not worked loose by the use of the implement. The fingers are curved outwardly as shown. This flanging and beading of the bars also serves to make them rigid.

The pivot ears 6 are provided with inturned flanges 13, through which the guard fingers are arranged. These guard fingers are preferably formed of wire bent into double loops, the outer arms of the double loops arranged through the ear flanges as illustrated. The ends of these guard finger arms project above the flanges and engage the pivot bolts 8. These guard fingers serve to prevent the objects picked up from rolling out and being formed of wires bent into the double loops, as illustrated they are sufficiently resilient and yielding to spring around a fixed object, such as a stone.

In the modified structure shown in Fig. V, the end guard is supported by arranging one arm through the flange of one of the side bars and hooking its upper end over the top of the side bar as shown. The other arm is provided with an eye for the pivot bolt. The fingers being formed of loops of wire, are provided with rounded ends which slip under the potatoes, roots or fruit, without impaling the same or causing other injury.

The implement is especially designed by me for picking up potatoes from the ground after they have been dug by hand or machine. In the latter case particularly, the potatoes are left well scattered and it is very arduous labor to pick them up. With my improved gathering implement, this picking up may be done more rapidly and easily. The implement is also applicable for general use in picking up articles and is desirable for use instead of a scoop, for removing vegetables from a bin or wagon. It is of particular advantage in such cases where work must be begun on the top of the pile or bin, in which case it is quite impractical to use a scoop.

I have illustrated and described my improved implement in an embodiment, which is effective and also has the advantage of simplicity of manufacture and great durability. Should one of the fingers be broken it can be replaced by prying up the clamping edge 12 of the head bar and slipping out the finger, a new finger can be inserted and the clamping bead or flange engaged thereon.

Having thus described my invention, what I claim as new and desire to secure by Letters Patent is:

1. In an implement of the class described, the combination with the handles, of head bars having inturned perforated flanges at their lower edges and pivot ears at their ends, one ear of each bar having an inturned perforated flange at its lower edge; outwardly curved fingers formed of loops of wire arranged through said perforations in said head bar flanges, the upper ends of said fingers being turned laterally, the upper edges of the head bars being folded over said laterally turned ends; pivots for said head ears, and guard fingers formed of double loops of wire, the outer arms of the guard fingers being arranged through said perforations in said pivot ear flanges and engaged with said pivots.

2. In an implement of the class described, the combination with the handles, of head bars having perforated flanges at their lower edges and pivot ears at their ends; outwardly curved fingers formed of loops of wire arranged through said perforations in said head bar flanges, the upper ends of said fingers being turned laterally, the upper edges of the head bars being folded over said laterally turned ends and pivots for said head ears.

3. In an implement of the class described, the combination with the handles, of head bars having perforated flanges at their lower edges and pivot ears at their ends, one ear of each bar having an inturned perforated flange at its lower edge; fingers arranged through said perforations in said head bar flanges, the upper ends of said fingers being turned laterally, the upper edges of the head bars being folded over said laterally turned ends; pivots for said head ears, and guard fingers arranged through said perforations in said pivot ear flanges and engaged with said pivots.

4. In an implement of the class described, the combination with the handles, of head bars having perforated flanges at their lower edges and pivot ears at their ends; fingers arranged through said perforations in said head bar flanges, the upper ends of said fingers being turned laterally, the upper edges of the head bars being folded over said laterally turned ends and pivots for said head ears.

5. In an implement of the class described, the combination with the handles, of head bars having flanges at their lower edges and pivot ears at their ends, one ear of each bar having an inturned flange at its lower edge; fingers arranged through said head bar flanges; means for securing the upper ends of said fingers to said bars; pivots for said head ears, and guard fingers arranged through said pivot ear flanges and means for securing said guard fingers.

6. In an implement of the class described, the combination with the handles, of head bars having inturned pivot ears at their ends and flanges at their lower edges, fingers formed of loops of wire, the arms of the loops being arranged through said head bar flanges, and means for securing the upper ends of the arms to said bars.

7. In an implement of the class described, in combination with the handles of the head bars having pivot ears at their ends; fingers secured to said head bars; pivots for said ears, and guard fingers formed of double loops of wire arranged at the ends of said head bars and engaged with said pivots.

In witness whereof, I have hereunto set my hand and seal in the presence of two witnesses.

CALVIN LOVETT. [L. S.]

Witnesses:
 LUELLA G. GREENFIELD,
 MARGARET SHAW.

Copies of this patent may be obtained for five cents each, by addressing the "Commissioner of Patents, Washington, D. C."